(12) United States Patent
Tietje

(10) Patent No.: US 7,658,428 B2
(45) Date of Patent: Feb. 9, 2010

(54) DEVICE FOR ATTACHING A BACKREST

(75) Inventor: Peter Tietje, Fahrenzhausen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 12/138,352

(22) Filed: Jun. 12, 2008

(65) Prior Publication Data
US 2008/0246297 A1    Oct. 9, 2008

Related U.S. Application Data

(63) Continuation of application No. PCT/EP2007/001189, filed on Feb. 12, 2007.

(30) Foreign Application Priority Data
Feb. 17, 2006    (DE) ................ 10 2006 007 374

(51) Int. Cl.
B60N 2/00    (2006.01)
(52) U.S. Cl. .................................................. 296/63
(58) Field of Classification Search ................ 296/63, 296/65.01, 65.05, 65.09, 187.12, 64, 65.16
See application file for complete search history.

(56) References Cited

U.S. PATENT DOCUMENTS

| | | | | |
|---|---|---|---|---|
| 4,008,919 A | * | 2/1977 | Muraishi | 297/331 |
| 4,124,250 A | * | 11/1978 | Weinich | 297/335 |
| 5,560,263 A | * | 10/1996 | Grassl et al. | 74/527 |
| 6,568,745 B2 | * | 5/2003 | Kosuge et al. | 296/193.02 |
| 2005/0017544 A1 | * | 1/2005 | Bull et al. | 296/187.08 |

FOREIGN PATENT DOCUMENTS

| | | |
|---|---|---|
| DE | 195 18 393 A1 | 10/1995 |
| DE | 195 24 560 A1 | 1/1997 |
| DE | 100 54 586 A1 | 6/2001 |
| DE | 100 36 848 A1 | 2/2002 |
| EP | 1 241 046 A1 | 9/2002 |
| JP | 2001-206122 | 7/2001 |
| JP | 2004-155239 A | 6/2004 |

OTHER PUBLICATIONS

German Search Report dated Nov. 15, 2006 including English translation of the relevant portion (Nine (9) pages).
International Search Report dated May 21, 2005 Including English translation of the relevant portion (Eight (8) pages).

* cited by examiner

*Primary Examiner*—Kiran B. Patel
(74) *Attorney, Agent, or Firm*—Crowell & Moring LLP

(57) ABSTRACT

Backrests of a rear seat system are attached to a cross member which extends between the wheel housings of the rear structure of a motor vehicle. Owing to this indirect attachment of the backrests, instead of a direct attachment to the rear structure, the intermediately connected cross member is in a position to absorb a large part of the impact force to which the backrests are exposed in a rear-end collision, and to dissipate this force by means of a parallelogram-like deformation. As a result, the rearward displacement of the backrests is reduced, thus improving the interior protection of the occupants.

13 Claims, 6 Drawing Sheets

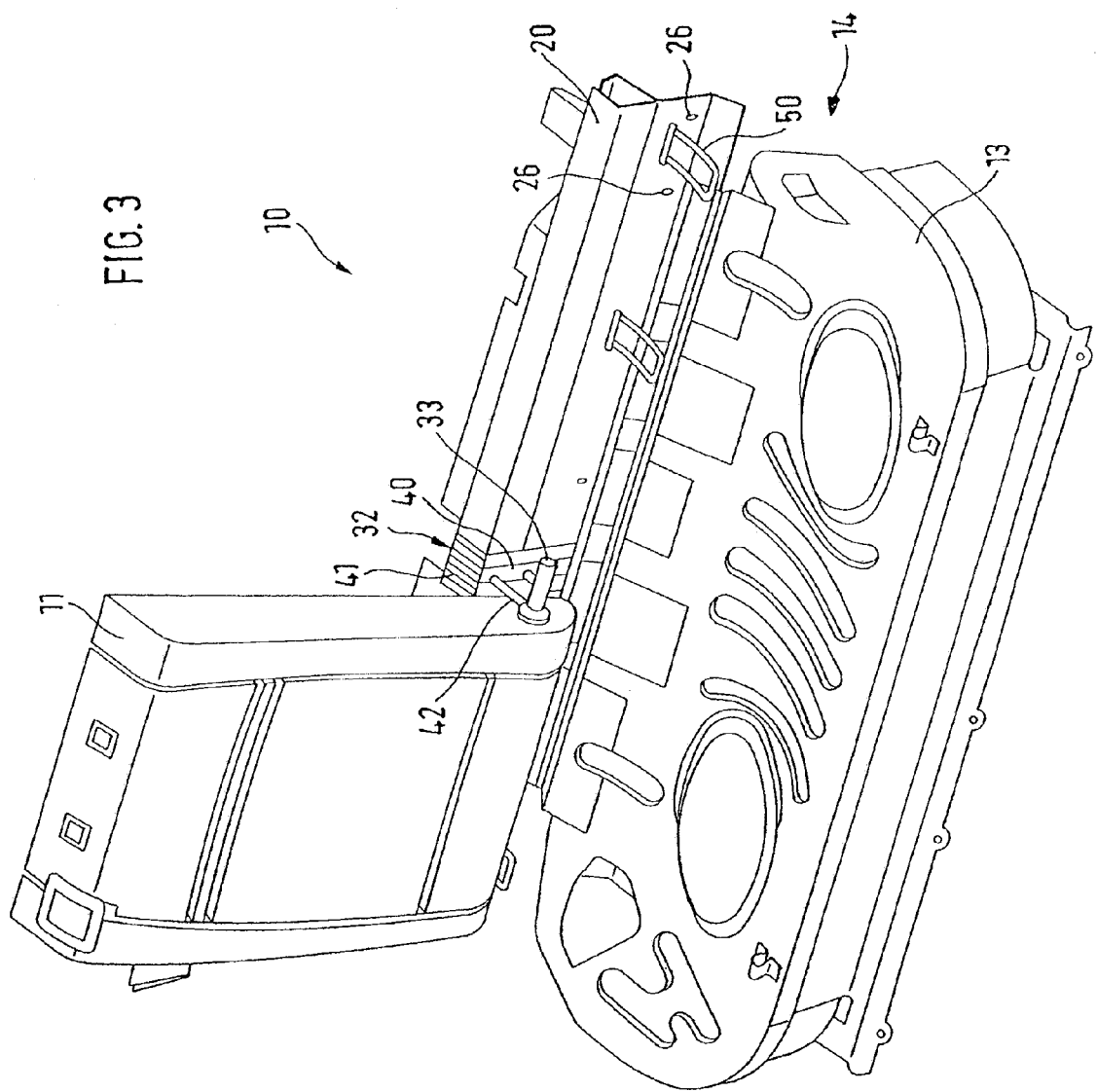

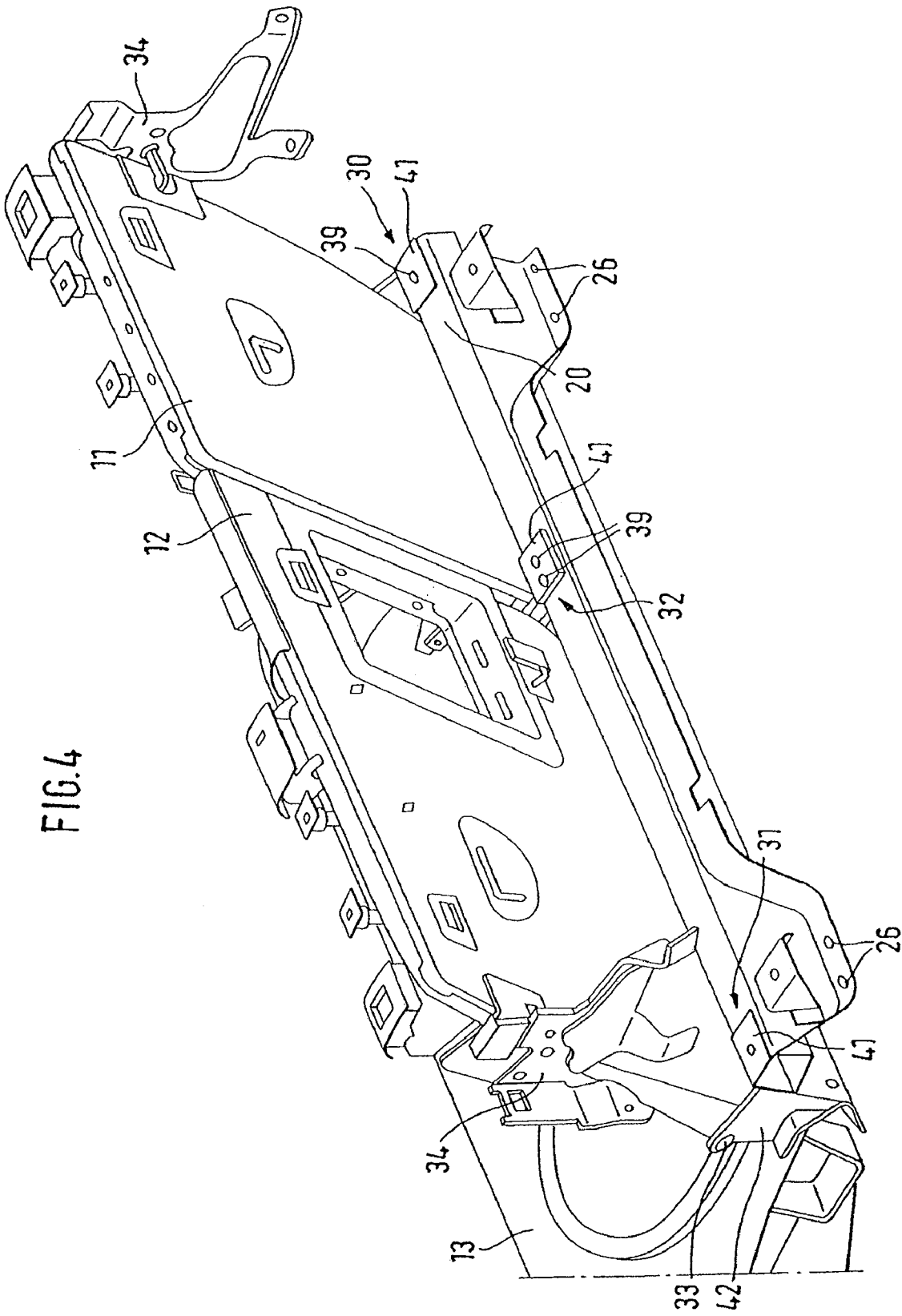

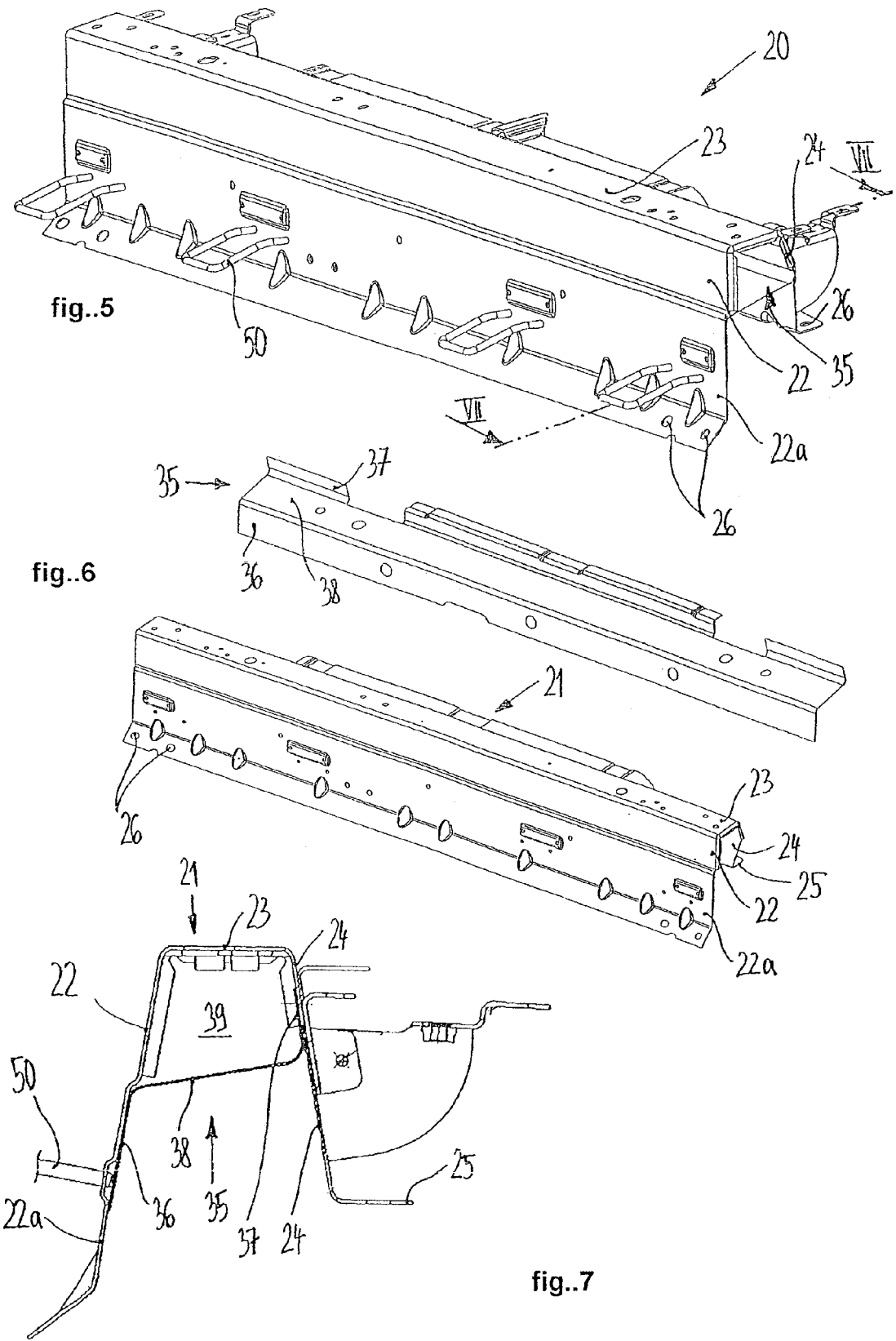
fig..5
fig..6
fig..7

PRIOR ART
fig..8
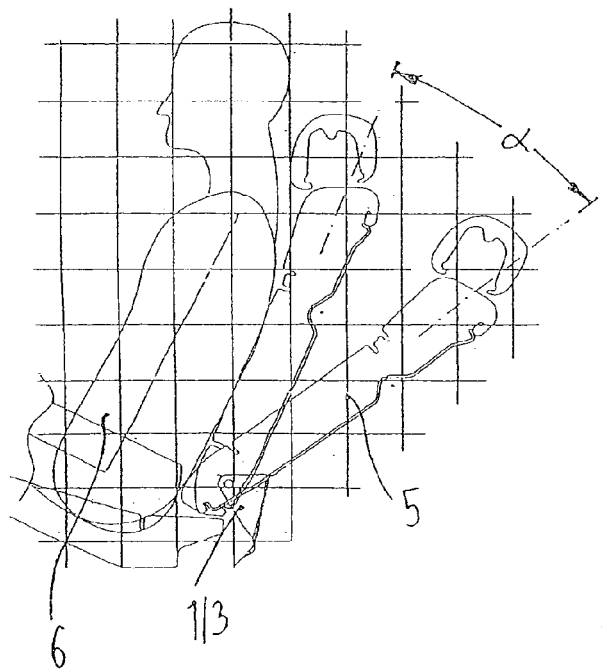
fig..9
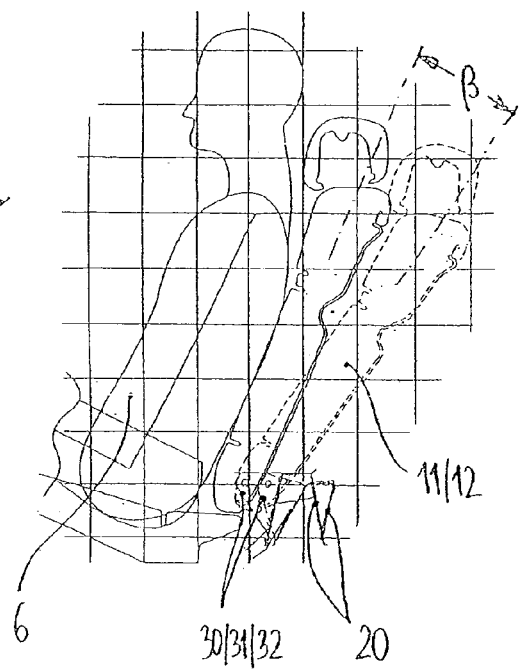

DEVICE FOR ATTACHING A BACKREST

CROSS-REFERENCE TO RELATED APPLICATIONS

This application is a continuation of PCT International Application No. PCT/EP2007/001189, filed on Feb. 12, 2007, which claims priority under 35 U.S.C. §119 to German Patent Application No. 10 2006 007 374.6, filed Feb. 17, 2006, the entire disclosures of which are expressly incorporated by reference herein.

BACKGROUND AND SUMMARY OF THE INVENTION

The invention relates to a device for attaching a backrest of a vehicle seat.

As shown in FIG. 1, the known backrests of a rear seat (not illustrated) of a motor vehicle are attached in the region of the wheel housings 2, exterior to the vehicle, via backrest support panels 1, and via a center bearing 3 on the rear structure of a motor vehicle, collectively designated as reference numeral 4. The force acting on a vehicle occupant in a rear-end collision is transmitted to the rear structure via the backrest. As shown in greater detail in FIG. 8, this causes a relatively severe deformation of the backrest support panels 1 and the center bearing 3, resulting in a great change in the angle α of the backrest 5 of approximately 30°. This subjects the vehicle occupants 6 to relatively high stress due to the displacement in the upper body area and in particular the head area.

The object of the invention is to design the device for attaching the backrest of a motor vehicle seat in such a way that stress on a vehicle occupant is reduced in the event of a rear-end collision.

This object is achieved by use of a device having the features of claim 1.

The core concept of the invention is to attach the backrest of a motor vehicle seat via a crossmember on the rear structure of the motor vehicle in such a way that in a rear-end collision the acting forces are largely dissipated in the crossmember. It is essential to the invention that the crossmember which dissipates energy is connected between the body of the motor vehicle and the support for the backrest in such a way that a significant portion of the collision energy may be dissipated. In a rear-end collision this reduces the angle by which the backrest is displaced opposite the direction of travel. In particular for compact vehicles, this prevents the head of a rear passenger from coming into contact with a rear window frame located behind the rear seat assembly.

A crossmember which extends transversely over the width of the vehicle for supporting a motor vehicle seat is known from DE 100 54 586 A1. In contrast to the present invention, however, the known crossmember supports seat rails for attaching the entire rear seat assembly. The known system does not provide an attachment solely of the backrest with an advantageous design for beneficial energy absorption in a rear-end collision.

According to one advantageous embodiment of the invention, front and rear boundary walls of the crossmember extend substantially in parallel in approximately vertical transverse planes of the vehicle. As a result of this design of the crossmember, in a rear-end collision the crossmember is deformed in the manner of a parallelogram essentially over its entire extension in the direction transverse to the vehicle, resulting in correspondingly high dissipation of energy in the crossmember. This reduces the proportion of the collision energy which must be dissipated by the supports for the backrest, resulting in less deformation of the supports and thus a smaller change in the angle of the backrest. The extent of the change in the angle of the backrest is also reduced by the fact that in a vehicular collision, as a result of the parallelogram-like deformation the crossmember is displaced primarily in the longitudinal direction of the vehicle. Only limited twisting of the crossmember occurs.

The supports for the backrest, which are designed as bearing blocks, are preferably provided in the form of swivel bearings to allow the backrests of the rear seat assembly to be folded down, thus increasing the storage space in the trunk in the region of the rear seat assembly. For a two-part backrest of a rear seat it is particularly advantageous to provide in addition to the two exterior swivel bearings a center bearing which takes over the support of the two backrest sections.

Even though the invention is described primarily in conjunction with backrests of rear seats, in principle the device may also be used on front seats of motor vehicles.

Advantageous embodiments of the invention are the subject matter of the subclaims.

One possible exemplary embodiment of the invention is illustrated in the drawings and described in greater detail below. The drawings show the following:

BRIEF DESCRIPTION OF THE DRAWINGS

FIGS. 2-7 and 9 refer to the same embodiment of the present invention. FIG. 2 shows a perspective view of a device according to an embodiment of the invention for attaching a backrest of a rear seat, viewed obliquely and exterior to the vehicle, opposite the direction of travel of the vehicle;

FIG. 3 shows an illustration corresponding to FIG. 2, viewed from inside the vehicle;

FIG. 4 shows an illustration corresponding to FIG. 2, viewed obliquely and exterior to the vehicle and in the direction of travel of the vehicle, with two backrest sections;

FIG. 5 shows a perspective illustration of a crossmember according to the FIG. 2 embodiment of the invention;

FIG. 6 shows an exploded illustration of the crossmember of FIG. 5;

FIG. 7 shows a vertical section corresponding to the sectional progression line VII-VII shown in FIG. 5;

FIG. 8 shows a schematic illustration of the rearward displacement of a backrest according to the prior art; and FIG. 9 shows an illustration, corresponding to FIG. 8, of the rearward displacement of the backrest in the FIG. 2 embodiment according to the invention.

DETAILED DESCRIPTION OF THE DRAWINGS

Figure 1:
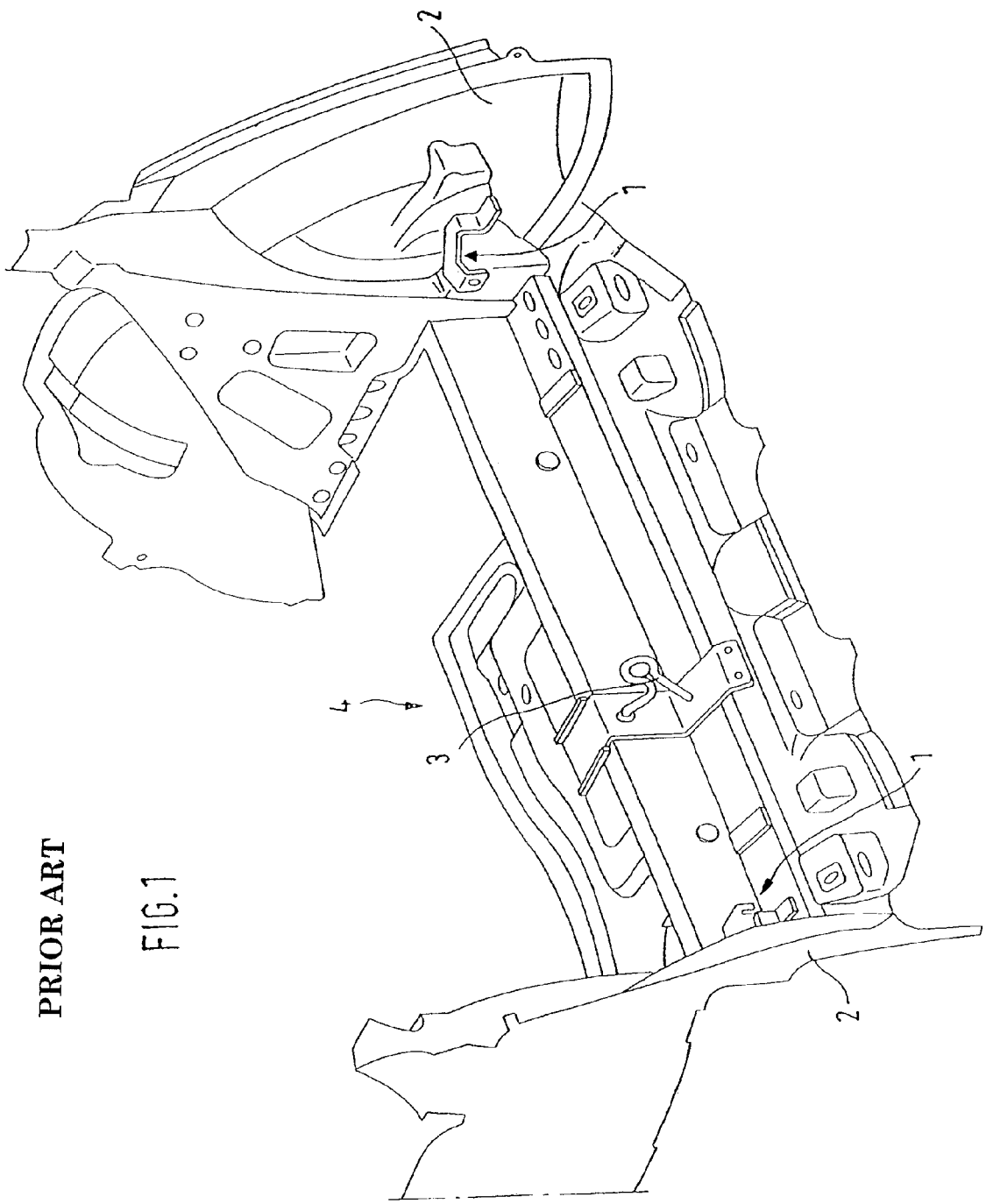
FIG. 1 shows a perspective illustration of the rear end region of a motor vehicle, with devices for attaching a backrest of a rear seat according to the prior art.
Figure 2:
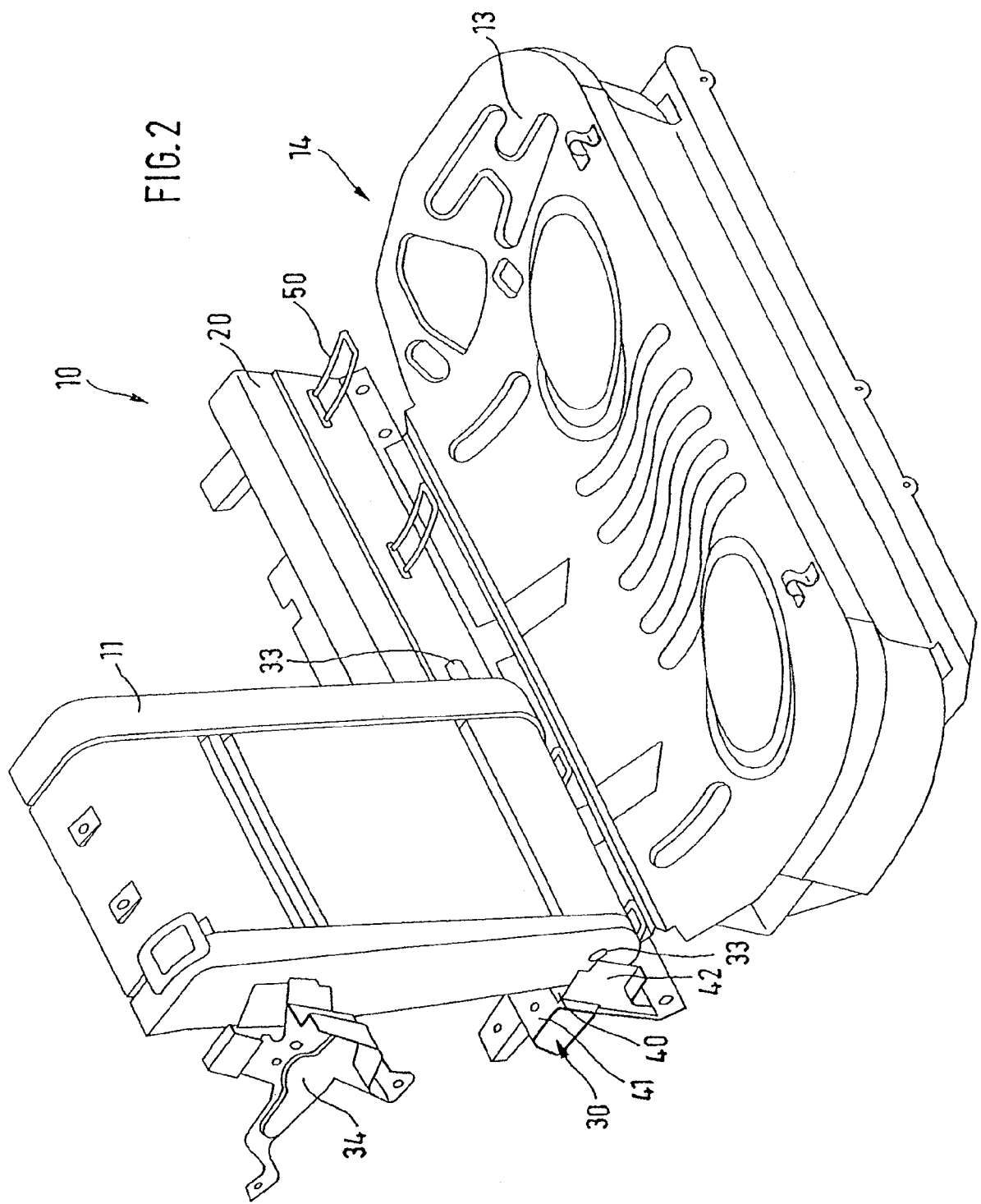

FIGS. 2 through 4 show a rear seat assembly of a motor vehicle, collectively designated as reference numeral 10, of which only a first backrest 11 and a second backrest 12 (FIG. 4) are illustrated. The seat cushions (not illustrated) of the rear seat assembly 10 are supported on a base panel 13 of the rear structure 14 of the motor vehicle.

According to this embodiment of the invention, a crossmember 20 is provided between the two rear wheel housings (not illustrated) of the rear structure 14. As shown in greater detail in particular in FIGS. 5 through 7, the crossmember 20 essentially comprises a U-shaped profile 21 having a front boundary wall 22, a bridge 23, and a rear boundary wall 24. The front and rear boundary walls 22 and 24, respectively, extend approximately in a vertical transverse plane of the vehicle and are oriented approximately in parallel. The bridge 23 connecting the two boundary walls 22 and 24 extends approximately in a horizontal plane.

The front boundary wall 22 extends beyond the lower end section 25 of the rear boundary wall 24, and continues downward in a lower section 22a. Thus, the front boundary wall 22 is considerably larger than the rear boundary wall 24. The lower section 22a of the front boundary wall 22 follows along a shoulder in the base panel 13 of the rear structure 14 of the motor vehicle, thereby achieving particularly favorable large surface-area contact between the crossmember 20 and the base panel 13. The crossmember 20 has through openings 26 for screwing the crossmember 20 to the rear structure 14 of the motor vehicle.

As shown in particular in FIGS. 6 and 7, the crossmember 20 is braced by a reinforcing profile 35 inside the profile 21. The reinforcing profile 35 has a Z-like shape with legs 36 and 37 which lie against the front and rear boundary walls 22 and 24, respectively, of the crossmember 20 and also contact a connecting ridge 38. The U-shaped profile 21 of the crossmember 20 which is open at the bottom is closed off by the reinforcing profile 35. This results in a resistant, closed cross section 39 which allows the crossmember 20 to dissipate large amounts of energy through deformation.

Of course, the closed cross section of the crossmember 20 may also be implemented in other ways, for example by a profile having a closed cross section, preferably a rectangular cross section.

The backrests 11 and 12 are asymmetrically divided, and are attached via supports 30 and 31 exterior to the vehicle in the region of the wheel housings, and via a central support in the form of a backrest center bearing 32 on the crossmember 20. The supports 30 through 32 have pivot pins 33 which allow the backrests 11 and 12 to be laid down, from the approximately vertical in-use position illustrated, to a horizontal storage position on the top side of the seat cushion of the rear seat assembly 10. This provides a load-through option from the trunk space into the interior of the motor vehicle. The backrests 11 and 12 are secured in their upright position by locks 34 on the bodywork of the motor vehicle.

The supports 30 and 31 on the exterior of the vehicle have an approximate L shape, with a first leg 40 which lies against the front boundary wall 22, 22a of the crossmember 20, and a second leg 41 which lies against the bridge 23 of the crossmember 20. A bracket 42 projects from the first leg 40 of the supports 30 and 31 and bears the pivot pins 33.

The bracket 42 for the backrest center bearing 32 bears a pivot pin 33 on each side, on which the first and the second backrest 11 and 12, respectively, are supported on their inner side facing the center plane of the vehicle. The supports 30, 31, and 32 have through holes 39 through which screws (not illustrated) pass for attaching the supports 30, 31, and 32 to the crossmember 20.

On the crossmember, which preferably is designed as a deep-drawn sheet metal component, additional add-on parts may be provided, such as the four illustrated ISOFIX attachments 50 for fastening a child seat to the rear seat assembly 10.

FIG. 9 illustrates the advantageous effect of the design of the crossmember 20 according to the invention. The crossmember 20 and backrests 11 and 12, illustrated by solid lines, show the initial state in normal driving operations. In this state the vehicle occupant 6 is seated in an essentially upright position. In a rear end collision, a force directed opposite the direction of travel is exerted on the backrests 11 and 12 as the result of the inertial force on the vehicle occupant 6. The crossmember 20 deforms under the effect of this force, as illustrated by dashed lines. This parallelogram-like deformation of the crossmember 20 is associated with only a relatively slight swiveling of the supports 30 through 32, as illustrated by the dashed-dotted lines, with the result that the backrests 11 and 12 swivel opposite the direction of travel by an angle $\beta$ of only slightly greater than 10°.

It is readily seen in comparison with FIG. 8 that the parallelogram-like deformation of the crossmember 20 (instead of the deformation of the supports 1 and 3) and the dissipation of energy thus realized results in a much lower swivel angle $\beta$ of the backrest 11, 12 compared to the swivel angle $\alpha$ for a backrest attachment according to the prior art corresponding to FIG. 8.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for attaching a backrest of a motor vehicle seat, wherein a crossmember extends over at least a portion of a width of the motor vehicle and is situated on the rear structure of the motor vehicle, has at least one support for attaching the backrest at a lower end section of the backrest, has a front boundary wall and a rear boundary wall, each of which extends approximately in a vertical transverse plane of the motor vehicle, has a bridge extending approximately horizontally between the front boundary wall and the rear boundary wall, and the at least one support for attaching the backrest is located at the front boundary wall at a height below the bridge.

2. The device according to claim 1, wherein the crossmember has a U-shaped profile which is open at the bottom.

3. The device according to claim 1, wherein the crossmember has a closed profile and a rectangular cross section.

4. The device according to claim 2, wherein a reinforcing profile is provided inside the crossmember.

5. The device according to claim 3, wherein a reinforcing profile is provided inside the crossmember.

6. The device according to claim 4, wherein the front boundary wall has a extension section which is extended downward with respect to the rear boundary wall, and extension section is positioned against a shoulder of the rear structure.

7. The device according to claim 5, wherein the front boundary wall has a extension section which is extended downward with respect to the rear boundary wall, and extension section is positioned against a shoulder of the rear structure.

8. The device according to claim 6, wherein the at least one support is an approximately L-shaped bearing block, a first leg of the approximately L-shaped bearing block extends approximately vertically and is positioned against the front boundary wall, and the second leg of the approximately L-shaped bearing block extends approximately horizontally and is positioned against the bridge of the crossmember.

9. The device according to claim 6, wherein the at least one support is an approximately L-shaped bearing block, a first leg of the approximately L-shaped bearing block extends approximately vertically and is positioned against the front boundary wall, and the second leg of the approximately L-shaped bearing block extends approximately horizontally and is positioned against the bridge of the crossmember.

10. The device according to claim 8, wherein the at least one support has a pivot pin for a swivel bearing of the backrest.

11. The device according to claim 9, wherein the at least one support has a pivot pin for a swivel bearing of the backrest.

12. The device according to claim 10, wherein the at least one support is a center support which is a backrest center bearing for two adjacent backrest sections.

13. The device according to claim 11, wherein the at least one support is a center support which is a backrest center bearing for two adjacent backrest sections.

* * * * *